United States Patent
Ito et al.

(10) Patent No.: US 6,462,165 B1
(45) Date of Patent: Oct. 8, 2002

(54) POLYCARBONATE AND OPTICAL MATERIAL

(75) Inventors: Mitsunori Ito; Shigeki Kuze, both of Ichihara (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 0 days.

(21) Appl. No.: 09/646,113

(22) PCT Filed: Mar. 10, 1999

(86) PCT No.: PCT/JP99/01159

§ 371 (c)(1),
(2), (4) Date: Sep. 26, 2000

(87) PCT Pub. No.: WO99/48947

PCT Pub. Date: Sep. 30, 1999

(30) Foreign Application Priority Data

| Mar. 26, 1998 | (JP) | 10-078685 |
| Oct. 12, 1998 | (JP) | 10-289118 |
| Nov. 27, 1998 | (JP) | 10-337348 |

(51) Int. Cl.⁷ .............................................. C08G 64/00
(52) U.S. Cl. ...................................... 528/196; 528/198
(58) Field of Search .................................. 528/196, 198

(56) References Cited

U.S. PATENT DOCUMENTS

| 5,525,701 A | 6/1996 | Tominari et al. |
| 5,852,156 A | 12/1998 | Hachiya et al. |

FOREIGN PATENT DOCUMENTS

| EP | 0 293 891 | 12/1988 |
| EP | 0 807 656 | 11/1997 |
| JP | 64-70528 | 3/1989 |
| JP | 314830 | * 1/1991 |
| JP | 3-54224 | 3/1991 |
| JP | 753709 | * 2/1995 |
| JP | 8302004 | * 11/1996 |
| JP | 970852 | * 3/1997 |
| JP | 9-110978 | 4/1997 |
| JP | 10-45893 | 2/1998 |

OTHER PUBLICATIONS

Patent Abstracts of Japan, JP 7–053709, Feb. 28, 1995.
Patent Abstracts of Japan, JP 9–070852, Mar. 18, 1997.

* cited by examiner

*Primary Examiner*—Terressa M. Boykin
(74) *Attorney, Agent, or Firm*—Oblon, Spivak, McClelland, Maier & Neustadt, P.C.

(57) ABSTRACT

Disclosed are polycarbonates which are obtained by preparing a polycarbonate prepolymer through prepolymerization followed by polymerizing it through solid-phase, swollen solid-phase or thin film melt-phase transesterification, and have a remaining monomer content of smaller than 100 ppm, especially a dihydroxy compound content of smaller than 100 ppm, or have an acetone soluble content of at most 3.5 or at most 3.0% by weight, or have a terminal hydroxyl fraction of smaller than 2 or smaller than 15 mol %; and optical materials and blow molding materials comprising the polycarbonate. The polycarbonates contain a reduced amount of impurities such as remaining monomers, oligomers and others and have improved physical properties including impact strength, and these are useful as optical materials and blow molding materials.

26 Claims, No Drawings

POLYCARBONATE AND OPTICAL MATERIAL

FIELD OF THE INVENTION

The present invention relates to polycarbonates, more precisely to those having a reduced content of impurities such as remaining monomers and oligomers and having excellent physical properties such as impact strength, and also to optical materials and blow molding materials.

DESCRIPTION OF THE BACKGROUND

Polycarbonates are excellent engineering plastics and are widely used in various fields. For producing them, known are a method of directly reacting an aromatic dihydroxy compound such as bisphenol A or the like with phosgene (interfacial process), and a method of transesterifying a dicarbonate such as diphenyl carbonate or the like with an aromatic dihydroxy compound such as bisphenol A or the like in a melt:or solid phase (melt-phase process, solid-phase process).

However, the interfacial process is problematic in that it requires toxic phosgene, the chlorine-containing side products such as hydrogen chloride, sodium chloride and the like formed corrode the apparatus used, and methylene chloride that may be in the resins formed is extremely difficult to remove and therefore the polycarbonates formed often contain chlorine.

On the other hand, the melt-phase process is free from the problems with the interfacial process, but is confronted with another problem in that the amount of monomers and other low-molecular-weight substances remaining in the polymers produced is large. As a result, the impact resistance of the polymers is low, and the polymers often adhere to molds.

To solve the problems, a method of adding a low-boiling-point compound to extruders in the melt-phase process has been proposed (Japanese Patent Laid-Open No. 5936/1997), but it is not still satisfactory. Neither proposal nor report is known, relating to the improvement in the solid-phase process.

The present invention is to solve the problems with polycarbonates produced through conventional transesterification, and to provide high-quality polycarbonates having good impact resistance and also optical materials and blow molding materials.

DETAILED DESCRIPTION OF THE PREFERRED EMBODIMENTS

We, the present inventors have assiduously studied to attain the object as above, and, as a result, have found that high-quality polycarbonates containing an extremely reduced amount of monomers and low-molecular-weight substances remaining therein can be obtained through transesterification by properly selecting the reaction method and the reaction condition to be employed. On the basis of this finding, we have completed the present invention.

Specifically, the invention provides polycarbonates described below.

[1] A polycarbonate obtained by preparing a polycarbonate prepolymer through prepolymerization followed by polymerizing the prepolymer through solid-phase, swollen solid-phase or thin film melt-phase transesterification, of which the total of the dihydroxy compound content, the dicarbonate content and the monohydroxy compound content is smaller than 100 ppm.

[2] A polycarbonate obtained by preparing a polycarbonate prepolymer through prepolymerization followed by polymerizing the prepolymer through solid-phase, swollen solid-phase or thin film melt-phase transesterification, of which the dihydroxy compound content is smaller than 100 ppm.

[3] A polycarbonate obtained through transesterification of a dihydroxy compound and a dicarbonate, of which the acetone soluble content is at most 2.0% by weight.

[4] A polycarbonate obtained by preparing a polycarbonate prepolymer through prepolymerization followed by polymerizing the prepolymer through thin film melt-phase transesterification, of which the acetone soluble content is at most 3.0% by weight.

[5] A polycarbonate obtained by preparing a polycarbonate prepolymer through prepolymerization followed by polymerizing the prepolymer through solid-phase or swollen solid-phase transesterification, of which the acetone soluble content is at most 3.5% by weight.

[6] A polycarbonate obtained by preparing a polycarbonate prepolymer through prepolymerization followed by polymerizing the prepolymer through solid-phase or swollen solid-phase transesterification, of which the terminal hydroxyl fraction is smaller than 2 mol %.

[7] A polycarbonate obtained by preparing a polycarbonate prepolymer through prepolymerization followed by polymerizing the prepolymer through thin film melt-phase transesterification, of which the terminal hydroxyl fraction is smaller than 15 mol %.

[8] A polycarbonate obtained by preparing a polycarbonate prepolymer through prepolymerization followed by polymerizing the prepolymer through solid-phase, swollen solid-phase or thin film melt-phase transesterification, of which the cyclic oligomer content is at most 0.45% by weight.

[9] The polycarbonate of above [1], [2], [5] or [8], for which the polycarbonate prepolymer is prepared through thermal prepolymerization of (A) an aromatic dihydroxy compound, (B) a dicarbonate and (C) a monohydroxy compound.

[10] A polycarbonate obtained by preparing a polycarbonate prepolymer through thermal prepolymerization of (A) an aromatic dihydroxy compound, (B) a dicarbonate and (C) a monohydroxy compound followed by polymerizing the prepolymer through solid-phase or swollen solid-phase transesterification, of which the monohydroxy compound-derived terminal fraction is at least 50 mol %.

[11] A polycarbonate obtained by preparing a polycarbonate prepolymer through thermal prepolymerization of (A) an aromatic dihydroxy compound, (B) a dicarbonate and (C) a monohydroxy compound followed by polymerizing the prepolymer through solid-phase or swollen solid-phase transesterification, of which the terminal hydroxyl fraction is smaller than 15 mol %.

[12] An optical material comprising the polycarbonate of any of above [1] to [11].

[13] The polycarbonate of any of above [1], [2], [5] or [8], for which the polycarbonate prepolymer is prepared through thermal prepolymerization of (A) an aromatic dihydroxy compound, (B) a dicarbonate and (C) a poly-functional organic compound having at least three functional groups.

[14] A polycarbonate obtained by preparing a polycarbonate prepolymer through thermal prepolymerization of (A) an aromatic dihydroxy compound, (B) a dicarbonate and (C) a poly-functional organic compound having at least three functional groups, followed by polymerizing the prepolymer through solid-phase or swollen solid-phase transesterification, of which the terminal hydroxyl fraction is smaller than 15 mol %.

[15] A blow molding material comprising the polycarbonate of above [13] or [14].

BEST MODES OF CARRYING OUT THE INVENTION

The polycarbonate of the invention includes those obtained through melt-phase or solid-phase transesterification of starting materials, (A) a dihydroxy compound and (B) a dicarbonate, and optionally (C) a terminating agent or a branching agent, especially those obtained by preparing a polycarbonate prepolymer through prepolymerization of (A) a dihydroxy compound and (B) a dicarbonateorphosgene, andoptionally (C) a terminating agent or a branching agent, followed by polymerizing the prepolymer through solid-phase, swollen solid-phase or thin film melt-phase transesterification. In preparing the polycarbonate prepolymer and polymerizing it, catalysts are used.

1. Characteristics of Polycarbonates of the Invention:

(1) In one aspect, the polycarbonate of the invention is obtained by preparing a polycarbonate prepolymer through prepolymerization followed by polymerizing the prepolymer through solid-phase, swollen solid-phase or thin film melt-phase transesterification, and the total of the dihydroxy compound content, the dicarbonate content and the monohydroxy compound content of the polycarbonate is smaller than 100 ppm. The dihydroxy compound content, the dicarbonate content and the monohydroxy compound content of the polycarbonate are measured through high-performance liquid chromatography in the following manner: 2 g of a polycarbonate sample is dissolved in 50 ml of dichloromethane, and 250 ml of acetone is added thereto little by little so as to deposit the polymer in the solution. This is filtered under suction, and 50 ml of acetonitrile is added to the filtrate. This is concentrated to about 10 ml. The resulting concentrate is put into a 50-ml messflask, and water is added thereto so as to have a ratio, acetonitrile/water=1/1 (by volume). This is filtered through a chromatography disc, 13P, and subjected to high-performance liquid chromatography. The condition for HPLC is as follows: The column is Toso's TSKgel ODS-80Ts. The mobile phase is comprised of an aqueous acetonitrile solution (liquid A) (acetonitrile/water=3/7, by volume) and an aqueous acetonitrile solution (liquid B), in which the ratio of liquid A/liquid B is varied from 100/0 (by volume) to 0/100 (by volume). With so varying the ratio of the two, 20 μl of the mixture for the mobile phase is introduced into the column over a period of 35 minutes, at a flow rate of 1.0 ml/min. For recording the data, a detector (wavelength: 217 nm) is used.

(2) Of polycarbonates obtained through transesterification of a dihydroxy compound and a dicarbonate, especially those obtained by preparing a polycarbonate prepolymer through prepolymerization followed by polymerizing the prepolymer through solid-phase, swollen solid-phase or thin film melt-phase transesterification, the acetone soluble content of the polycarbonate, for which the prepolymer is polymerized in any of the former two solid-phase reaction modes, is at most 3.5% by weight, while that of the polycarbonate, for which the prepolymer is polymerized in the latter liquid-phase reaction mode, is at most 3.0% by weight, preferably at most 2.0% by weight. The acetone soluble content of the polycarbonate is measured according to the following method: 3 g of a sample of polycarbonate flakes having passed through a 100-mesh wire gauze is put into a cylindrical paper filter No. 84 (28 mm×100 mm), and extracted with 100 ml of acetone for 8 hours while being refluxed at intervals of once for 3 to 4 minutes (20 ml/once). Next, 100 ml of acetone is evaporated away, and the residue is dried overnight in vacuum at 110° C., and its weight is measured. This indicates the acetone soluble content of the polycarbonate sample tested.

(3) In another aspect, the polycarbonate of the invention is obtained by preparing a polycarbonate prepolymer through prepolymerization followed by polymerizing the prepolymer through solid-phase, swollen solid-phase or thin film melt-phase transesterification, and the cyclic oligomer content of the polycarbonate is at most 0.45% by weight.

The cyclic oligomer content of the polycarbonate is measured according to the following method: 2 g of a polycarbonate sample is dissolved in 50 ml of dichloromethane, and 250 ml of acetone is added thereto little by little so as to deposit the polymer in the solution. This is filtered under suction, and the filtrate is dried. This is dissolved in 50 ml of diethyl ether, then filtered under normal pressure, and dried. Chloroform is added thereto to make it have a constant volume of 20 ml. This is filtered through a chromatography disc, 13P, and subjected to high-performance liquid chromatography to determine the cyclic oligomer content of the sample.

(4) In still another aspect, the polycarbonate of the invention is obtained by preparing a polycarbonate prepolymer through prepolymerization followed by polymerizing the prepolymer through solid-phase, swollen solid-phase or thin film melt-phase transesterification, and the terminal hydroxyl fraction of the polycarbonate, for which the prepolymer is polymerized in any of the former two solid-phase reaction modes, is smaller than 2 mol %, while that of the polycarbonate, for which the prepolymer is polymerized in the latter liquid-phase reaction mode, is smaller than 15 mol %.

The terminal hydroxyl fraction of the polycarbonate is measured according to the following method: A polycarbonate sample is subjected to $^1$H-NMR (400 MHz, 128 integration cycles), for which is used $CD_2Cl_2$ as the solvent. On the $^1$H-NMR chart, Ha and He are read, from which the terminal hydroxyl fraction of the sample is obtained according to the following equation:

Terminal hydroxyl fraction=(Ha/2)/(Ha/2+He/2) wherein Ha indicates the integrated ratio of the peaks derived from two hydrogens that are ortho-positioned in the benzene ring of the terminal phenyl group relative to the OH group bonding to the group; He indicates the integrated ratio of the peaks derived from two hydrogens that are meta-positioned in the benzene ring of the terminal phenylcarbonate group relative to COO bonding to the group.

(5) In still another aspect, the polycarbonate of the invention is obtained by preparing a polycarbonate prepolymer through thermal prepolymerization of (A) an aromatic dihydroxy compound, (B) a dicarbonate and (C) a monohydroxy compound, followed by polymerizing the prepolymer through solid-phase or swollen solid-phase transesterification, and the monohydroxy compound-derived terminal fraction of the polycarbonate is at least 50 mol %.

To analyze its terminal structure, the polycarbonate is subjected to $^{13}$C-NMR (125.65 MHz, 24 integration cycles), for which is used $CD_2Cl_2$ as the solvent. From the $^{13}$C-NMR data, obtained is the monohydroxy compound-derived terminal fraction of the polycarbonate.

(6) In still another aspect, the polycarbonate of the invention is obtained by preparing a polycarbonate prepolymer through thermal prepolymerization of (A) an aromatic dihydroxy compound, (B) a dicarbonate and (C) a monohydroxy compound, followed by polymerizing the prepolymer through solid-phase or swollen solid-phase transesterification, and the terminal hydroxyl fraction of the polycarbonate is smaller than 15 mol %.

The terminal hydroxyl fraction of the polycarbonate is measured in the same manner as in the above (4).

(7) In still another aspect, the polycarbonate of the invention is obtained by preparing a polycarbonate prepolymer through thermal prepolymerization of (A) an aromatic dihydroxy compound, (B) a dicarbonate and (C) a polyfunctional organic compound having at least three functional groups, followed by polymerizing the prepolymer through solid-phase or swollen solid-phase transesterification, and the terminal hydroxyl fraction of the polycarbonate is smaller than 15 mol %.

The terminal hydroxyl fraction of the polycarbonate is measured in the same manner as in the above (4).

2. Method for Producing Polycarbonates of the Invention:

(1) Starting Materials

(A) Dihydroxy Compound

The starting dihydroxy compound for the component (A) includes, for example, aromatic dihydroxy compounds and aliphatic dihydroxy compounds, and at least one selected from them may be used in the invention.

Aromatic dihydroxy compounds usable herein for the component (A) include those of a general formula (I):

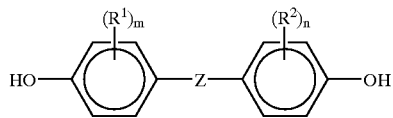

(I)

In formula (I), $R^3$ and $R^4$ each represent a halogen atom such as a fluorine, chlorine, bromine or iodine atom, or an alkyl group having from 1 to 8 carbon atoms such as a methyl, ethyl, n-propyl, isopropyl, n-butyl, isobutyl, sec-butyl, t-butyl, pentyl, hexyl, cyclohexyl, heptyl or octyl group. $R^3$ and $R^4$ may be the same or different ones. Plural $R^3$'s, if any, may be the same or different ones; and plural $R^4$'s, if any, may be the same or different ones. m and n each represent an integer of from 0 to 4. Z represents a single bond, an alkylene group having from 1 to 8 carbon atoms, an alkylidene group having from 2 to 8 carbon atoms, a cycloalkylene group having from 5 to 15 carbon atoms, a cycloalkylidene group having from 5 to 15 carbon atoms, or a bond of —S—, —SO—, —SO$_2$—, —O— or —CO—, or a bond of the following formula (II) or (II'):

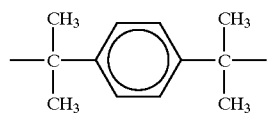

(II)

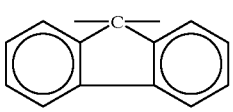

(II')

The alkylene group having from 1 to 8 carbon atoms and the alkylidene group having from 2 to 8 carbon atoms include, for example, methylene, ethylene, propylene, butylene, pentylene, hexylene, ethylidene and isopropylidene groups. The cycloalkylene group having from 5 to 15 carbon atoms and the cycloalkylidene group having from 5 to 15 carbon atoms include, for example, cyclopentylene, cyclohexylene, cyclopentylidene and cyclohexylidene groups.

Aromatic dihydroxy compounds of formula (I) include, for example, bis(hydroxyaryl)alkanes such as bis(4-hydroxyphenyl)methane, bis(3-methyl-4-hydroxyphenyl) methane, bis(3-chloro-4-hydroxyphenyl)methane, bis(3,5-dibromo-4-hydroxyphenyl)methane, 1,1-bis(4-hydroxyphenyl)ethane, 1,1-bis(2-t-butyl-4-hydroxy-3-methylphenyl)ethane, 1,1-bis(2-t-butyl-4-hydroxy-3-methylphenyl)ethane, 1-phenyl-1,1-bis(3-fluoro-4-hydroxy-3-methylphenyl)ethane, 2,2-bis(4-hydroxyphenyl)propane (generally referred to as bisphenol A), 2,2-bis(3-methyl-4-hydroxyphenyl)propane, 2,2-bis(2-methyl-4-hydroxyphenyl)propane, 2,2-bis (3,5-dimethyl-4-hydroxyphenyl)propane, 1,1-bis(2-t-butyl-4-hydroxy-5-methylphenyl)propane, 2,2-bis(3-chloro-4-hydroxyphenyl)propane, 2,2-bis(3-fluoro- 4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(4-hydroxyphenyl)butane, 2,2-bis(4-hydroxyphenyl)octane, 2,2-bis(4-hydroxyphenyl) phenylmethane, 2,2-bis(4-hydroxy-1-methylphenyl) propane, 1,1-bis(4-hydroxy-t-butylphenyl)propane, 2,2-bis (4-hydroxy-3-bromophenyl)propane, 2,2-bis(4-hydroxy-3, 5-dimethylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, 2,2-bis(3-bromo-4-hydroxy-5-chlorophenyl)propane, 2,2-bis (3-phenyl-4-hydroxyphenyl) propane, 2,2-bis(4-hydroxyphenyl)butane, 2,2-bis(3-methyl-4-hydroxyphenyl)butane, 1,1-bis(2-butyl-4-hydroxy-5-methylphenyl)butane, 1,1-bis(2-t-butyl-4-hydroxy-5-methylphenyl)butane, 1,1-bis(2-t-butyl-4-hydroxy-5-methylphenyl)isobutane, 1,1-bis(2-t-amyl-4-hydroxy-5-methylphenyl)butane, 2,2-bis(3,5-dichloro-4-hydroxyphenyl)butane, 2,2-bis(3,5-dibromo-4-hydroxyphenyl)butane, 4,4-bis(4-hydroxyphenyl)heptane, 1,1-bis(2-t-butyl-4-hydroxy-5-methylphenyl)heptane, 2,2-bis(4-hydroxyphenyl)octane, 1,1-(4-hydroxyphenyl)ethane, etc.; bis(hydroxyaryl)cycloalkanes such as 1,1-bis(4-hydroxyphenyl)cyclopentane, 1,1-bis(4-hydroxyphenyl) cyclohexane, 1,1-bis(3-methyl-4-hydroxyphenyl) cyclohexane, 1,1-bis(3-cyclohexyl-4-hydroxyphenyl) cyclohexane, 1,1-bis(3-phenyl-4-hydoxyphenyl) cyclohexane, 1,1-bis(4-hydroxyphenyl)-3,5,5-trimethylcyclohexane, etc.; bis(hydroxyaryl) ethers such as bis (4-hydroxyphenyl) ether, bis (4-hydroxy-3-methylphenyl) ether, etc.; bis(hydroxyaryl)sulfides such as bis(4-hydroxyphenyl)sulfide, bis(3-methyl-4-hydroxyphenyl) sulfide, etc.; bis(hydroxyaryl)sulfoxides such as bis(4-hydroxyphenyl)sulfoxide, bis(3-methyl-4-hydroxyphenyl) sulfoxide, bis(3-phenyl-4-hydroxyphenyl)

sulfoxide, etc.; bis(hydroxyaryl)sulfones such as bis(4-hydroxyphenyl) sulfone, bis(3-methyl-4-hydroxyphenyl) sulfone, bis(3-phenyl-4-hydroxyphenyl)sulfone, etc.; dihydroxybiphenyls such as 4,4'-dihydroxybiphenyl, 4,4'-dihydroxy-2,2-dimethylbiphenyl, 4,4'-dihydroxy-3,3'-dimethylbiphenyl, 4,4'-dihydroxy-3,3'-dicyclohexylbiphenyl, 3,3'-difluoro-4,4'-dihydroxybiphenyl, etc.

In addition to the above-mentioned compounds of formula (I), also usable herein are other aromatic dihydroxy compounds such as dihydroxybenzenes, halogen and alkyl-substituted dihydroxybenzenes, etc. For example, they are resorcinol, 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol, 2,3,4,6-tetrabromoresorcinol, catechol, hydroquinone, 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,5-dichlorohydroquinone, 2,3,5,6-tetramethylhydroquinone, 2,3,4,6-tetra-t-butylhydroquinone, 2,3,5,6-tetrafluorohydroquinone, 2,3,5,6-tetrabromohydroquinone, etc.

Various types of aliphatic dihydroxy compounds are usable herein for the component (A). For example, they include butane-1,4-diol, 2,2-dimethylpropane-1,3-diol, hexane-1,6-diol, diethylene glycol, triethylene glycol, tetraethylene glycol, octaethylene glycol, dipropylene glycol, N,N-dimethyldiethanolamine, cyclohexane-1,3-diol, cyclohexane-1,4-diol, 1,4-dimethylolcyclohexane, p-xylylene glycol, 2,2-bis- (4-hydroxycyclohexyl)propane, as well as ethoxylated or propoxylated products of dihydric alcohols or phenols, such as bis-oxyethyl-bisphenol A, bis-oxyethyl-tetrachlorobisphenol A, bis-oxyethyl-tetrachlorohydroquinone, etc.

In preferred methods of producing the polymers of the invention, one or more of the compounds mentioned above are suitably selected and used for the dihydroxy compound component (A). Of those, preferred is bisphenol A, one of aromatic dihydroxy compounds.

Further usable herein are diesters of dihydroxy compounds, dicarbonates of dihydroxy compounds, monocarbonates of dihydroxy compounds, etc.

Diesters of dihydroxy compounds include, for example, bisphenol A diacetate, bisphenol A dipropionate, bisphenol A dibutyrate, bisphenol A dibenzoate, etc.

Dicarbonates of dihydroxy compounds include, for example, bisphenol Abismethyl carbonate, bisphenol Abisethyl carbonate, bisphenol A bisphenyl carbonate, etc.

Monocarbonates of dihydroxy compounds include, for example, bisphenol A monomethyl carbonate, bisphenol A monoethyl carbonate, bisphenol A monopropyl carbonate, bisphenol A monophenyl carbonate, etc.

Component (B)

<1> Dicarbonate:

Various types of dicarbonates are usable in the invention. For example, used is at least one selected from diaryl carbonates, dialkyl carbonates and alkylaryl carbonates.

Diaryl carbonates usable for the component (B) include compounds of a general formula (III):

(III)

wherein $Ar^1$ and $Ar^2$ each represent an aryl group, and these may be the same or different ones;

and compounds of a general formula (IV):

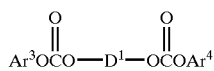
(IV)

wherein $Ar^3$ and $Ar^4$ each represent an aryl group, and these may be the same or different ones; and $D^1$ represents a residue of an aromatic dihydroxy compound of those mentioned above from which 2 hydroxyl groups are removed.

Dialkyl carbonates also usable herein include compounds of a general formula (V):

(V)

wherein $R^5$ and $R^6$ each represent an alkyl group having from 1 to 6 carbon atoms or a cycloalkyl group having from 4 to 7 carbon atoms, and these may be the same or different ones;

and compounds of a general formula (VI):

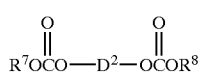
(VI)

wherein $R^7$ and $R^8$ each represent an alkyl group having from 1 to 6 carbon atoms or a cycloalkyl group having from 4 to 7 carbon atoms, and these maybe the same or different ones; and $D^2$ represents a residue of an aromatic dihydroxy compound of those mentioned above from which 2 hydroxyl groups are removed.

Alkylaryl carbonates also usable herein include compounds of a general formula (VII):

(VII)

wherein $Ar^5$ represents an aryl group; and $R^9$ represents an alkyl group having from 1 to 6 carbon atoms or a cycloalkyl group having 4 carbon atoms;

and compounds of a general formula (VIII):

(VIII)

wherein $Ar^6$ represents an aryl group; $R^{10}$ represents an alkyl group having from 1 to 6 carbon atoms or a cycloalkyl group having from 4 to 7 carbon atoms; and $D^3$ represents a residue of an aromatic dihydroxy compound of those mentioned above from which 2 hydroxyl groups are removed.

The diaryl carbonates include, for example, diphenyl carbonate, ditolyl carbonate, bis(chlorophenyl) carbonate, m-cresyl carbonate, dinaphthyl carbonate, bis(diphenyl) carbonate, bisphenol A bisphenyl carbonate, etc.

The dialkyl carbonates include, for example, diethyl carbonate, dimethyl carbonate, dibutyl carbonate, dicyclohexyl carbonate, bisphenol A bismethyl carbonate, etc.

The alkylaryl carbonates include, for example, methylphenyl carbonate, ethylphenyl carbonate, butylphenyl carbonate, cyclohexylphenyl carbonate, bisphenol A methylphenyl carbonate, etc.

In the invention, one or more of the compounds mentioned above are suitably selected and used as the dicarbonate component (B). Of those, preferred is diphenyl carbonate.

One or more of the compounds mentioned above are suitably selected and used as the dicarbonate component (B). Of those, preferred is diphenyl carbonate.

<2> Phosgene:

For the component (B) to prepare the polycarbonate prepolymer through prepolymerization, phosgene may be used.

Component (C)

If desired, a terminating agent, a branching agent and an antioxidant may be added to the reaction system as the starting materials in producing the polycarbonates of the invention.

<1> Terminating Agent:

As the terminating agent, herein usable are monophenols, including, for example, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol, 2,5-dicumylphenol, 3,5-dicumylphenol, p-tert-butylphenol, p-cumylphenol, p-phenylphenol, o,m,p-t-octylphenol, o,m,p-n-octylphenol, etc. One or more of these may be used either singly or as combined. Of those, especially preferred are 2,6-di-t-butylphenol, 2,5-di-t-butylphenol, 2,4-di-t-butylphenol, 3,5-di-t-butylphenol, 2,5-dicumylphenol, 3,5-dicumylphenol, p-tert-butylphenol, p-cumylphenol, p-t-octylphenol, and p-phenylphenol.

<2> Branching Agent:

As the branching agent, herein usable are poly-functional organic compounds having at least three functional groups. Concretely, they have at least three functional groups of hydroxyl groups, carboxyl groups, amino groups, imino groups, formyl groups, acid halide groups, haloformate groups and the like, in one molecule, including, for example, phloroglucinol, mellitic acid, trimellitic acid, trimellitic acid chloride, trimellitic acid anhydride, gallic acid, n-propyl gallate, protocatechuic acid, pyromellitic acid, pyromellitic acid secondary anhydride, α-resorcylic acid, β-resorcylic acid, resorcylaldehyde, trimellityl chloride, trimethyltrichloride, 4-chloroformylphthalic acid anhydride, benzophenone-tetracarboxylic acid, 2,4,4'-trihydroxybenzophenone, 2,2', 4,4'-tetrahydroxybenzophenone, 2,4,4'-trihydroxyphenyl ether, 2,2', 4,4'-tetrahydroxyphenyl ether, 2,4,4'-trihydroxydiphenyl-2-propane, 2,2'-bis(2,4-dihydroxy) propane, 2,2',4,4'-tetrahydroxydiphenylmethane, 2,4,4'-trihydroxydiphenylmethane, 1- [α-methyl-α-(4'-hydroxyphenyl)ethyl]-4- [α',α'-bis (4''-hydroxyphenyl) ethyl]benzene, α,α',α''-tris (4-hydroxyphenyl)-1,3,5-triisopropylbenzene, 2,6-bis(2'-hydroxy-5'-methylbenzyl)-4-methylphenol, 4,6-dimethyl-2,4,6-tris(4'-hydroxyphenyl)-heptene-2,4,6-dimethyl-2,4,6-dimethyl-tris(4-hydroxyphenyl)-heptane-2,1,3,5-tris(4-hydroxyphenyl) benzene, 1,1,1-tris (4'-hydroxyphenyl)ethane, 2,2-bis[4,4-bis(4'-hydroxyphenyl)cyclohexyl]-propane, 2,6-bis(2'-hydroxy-5'-isopropylbenzyl)-4-isopropylphenol, bis[2-hydroxy-3-(2'-hydroxy-5'-methylbenzyl)-5-methylphenyl] methane, bis[2-hydroxy-3-(21-hydroxy-5'-isopropylbenzyl)-5-methylphenyl]methane, tetrakis(4-hydroxyphenyl)methane, tris(4-hydroxyphenyl) phenylmethane, 2',4,7-trihydroxyflavan, 2,4,4-trimethyl-2', 4'-dihydroxyphenylisopropyl)benzene, tris(4'-hydroxyaryl)-amyl-s-triazine, 1-[α-methyl-α-(4'-hydroxyphenyl)ethyl]-3- [α',α'-bis(4''-hydroxyphenyl)ethyl]benzene, isatin-bis(o-cresol), α,α,α',α'-tetrakis(4-hydroxyphenyl)-p-xylene, α,α, α',α'-tetrakis(3-methyl-4-hydroxyphenyl)-p-xylene, α,α,α', α'-tetrakis (2-methyl-4-hydroxyphenyl) -p-xylene, α,α,α', α'-tetrakis(2,5-dimethyl-4-hydroxyphenyl)-p-xylene, α,α, α',α'-tetrakis(2,6-dimethyl-4-hydroxyphenyl)-p-xylene, α, α'-dimethyl-α,α,α',α'-tetrakis (4-hydroxyphenyl) -p-xylene, etc. One or more of these branching agents may be used either singly or as combined.

Above all, especially preferred are 1,1,1-tris(4-hydroxyphenyl)ethane, 1,1,1-tris(4-hydroxy-3-methylphenyl)ethane, 1,1,1-tris(4-hydroxy-3,5-dimethylphenyl)ethane, 1,1,1-tris(3-chloro-4-hydroxyphenyl)ethane, 1,1,1-tris(3,5-dichloro-4-hydroxyphenyl)ethane, 1,1,1-tris(3-bromo-4-hydroxyphenyl)ethane, 1,1,1-tris(3,5-dibromo-4-hydroxyphenyl)ethane, tris(4-hydroxyphenyl)methane, tris(4-hydroxy-3-methylphenyl)methane, tris(4-hydroxyphenyl-3,5-dimethylphenyl)methane, tris(3-chloro-4-hydroxyphenyl)methane, tris(3,5-dichloro-4-hydroxyphenyl)methane, tris(3-bromo-4-hydroxyphenyl) methane, tris(3,5-dibromo-4-hydroxyphenyl)methane, α,α'-dimethyl-α,α,α',α'-tetrakis(4-hydroxyphenyl)-p-xylene, etc.

<3> Antioxidant:

Preferred are phosphorus-containing antioxidants for use herein, including, for example, trialkyl phosphates, tricycloalkyl phosphites, triaryl phosphites, monoalkyldiaryl phosphites, trialkyl phosphates, tricycloalkyl phosphates, triaryl phosphates, etc.

(2) Preparation of Prepolymer Through Prepolymerization

Prepolymers are prepared through prepolymerization of the above-mentioned starting materials, a dihydroxy compound for the component (A), a dicarbonate or phosgene for the component (B), and optionally a terminating agent or a branching agent for the component (C). In this reaction, preferably, at least one selected from nitrogen-containing organic basic compounds or phosphorus-containing basic compounds is used as the polymerization catalyst. Preferred methods and conditions for the prepolymerization are concretely described hereinunder.

<1> Method of Prepolymerization:

(a) A dihydroxy compound, a dicarbonate, and optionally a terminating agent or a branching agent are reacted under heat to give a prepolymer while the aromatic monohydroxy compound formed is removed. Preferably, the prepolymer prepared in the step of prepolymerization has a polymerization-average molecular weight falling between 2000 and 20000. It is desirable that the prepolymerization is effected in a melt phase. The reaction may be effected in an inert solvent, but may be effected in no solvent. The inert solvent includes, for example, aromatic compounds such as diphenyl ether, halogenated diphenyl ethers, benzophenone, polyphenyl ethers, dichlorobenzene, methylnaphthalene, etc.; gases such as carbon dioxide, dinitrogen monoxide, nitrogen etc.; chlorofluorohydrocarbons; alkanes such as ethane, propane, etc.; cycloalkanes such as cyclohexane, tricyclo(5,2,10)decane, cyclooctane, cyclodecane, etc.; alkenes such as ethene, propene, etc. The ratio of the dihydroxy compound to the dicarbonate to be reacted therewith (that is, the ratio of the two reactants to be fed into a reactor) varies, depending on the type of the reactants and on the reaction condition including the reaction temperature and the reaction pressure. In general, the amount of the dicarbonate may fall between 0.9 and 2.5 mols, preferably between 0.95 and 2.0 mols, more preferably between 0.98 and 1.5 mols, relative to one mol of the dihydroxy compound. In case where a monohydroxy compound is used as the terminating agent or a poly-functional organic compound having at least three functional groups is used as the branching agent, the amount of the former may fall generally between 0.001 and 20 mols, but preferably between 0.0025 and 15 mols, more preferably between 0.005 and 10 mols, relative to one mol of the dihydroxy compound, and, similarly, the amount of the latter may fall generally between 0.001 and 20 mols, but preferably between 0.0025 and 15 mols, more preferably between 0.005 and 10 mols, relative to one mol of the dihydroxy compound.

The reaction temperature, the reaction pressure and the reaction time vary, depending on the type and the amount of the starting materials and the catalyst used, on the intended degree of polymerization of the prepolymer to be prepared, and on the other reaction conditions. Preferably, the reaction temperature falls between 50 and 350° C., more preferably between 100 and 320° C., even more preferably between 150 and 280° C.; the pressure falls preferably between 0.1 Torr and 5 kg/cm$^2$; and the time falls preferably between 1 minute and 100 hours, more preferably between 2 minutes and 10 hours.

In order not to discolor the prepolymer formed, it is desirable that the prepolymerization is effected at a lower possible temperature for a shorter possible period of time.

The reactor for the step of preparing the prepolymer may be any known polymerization reactor. The reaction may be effected in one stage or in plural stages. One reactor may be used, or plural reactors may be connected in series or in parallel. The reaction may be effected in a batchwise process or in a continuous process, or even in their combination.

The ratio of the terminals in the prepolymer to be produced in the prepolymerization step is preferably such that the ratio of phenylcarbonate terminal to hydroxyl terminal falls between 1/1 and 1/0.1, more preferably between 1/0.6 and 1/0.25. If the terminal ratio falls outside the defined range, the molecular weight of the final polymers to be obtained will be unfavorably limited, and it will be difficult to obtain high-molecular polymers.

In progress of the prepolymerization, an aromatic monohydroxy compound is formed, which is a compound having a hydroxyl group bonded to the aryl group as derived from the diaryl carbonate used. Removing this from the reaction system promotes the reaction. For this, preferably employed is a method of effectively agitating the reaction system with introducing an inert gas, such as nitrogen, argon, helium, carbon dioxide or the like, or a lower hydrocarbon gas into the system, thereby to remove the aromatic monohydroxy compound along with the gas; a method of effecting the reaction under reduced pressure; or a combination of these methods.

(b) An aromatic dihydroxy compound may be reacted with phosgene in a known manner to prepare a prepolymer.
<2> Catalyst for Prepolymerization:

As the catalyst for prepolymerization, preferably used are nitrogen-containing, organic basic compounds. The nitrogen-containing, organic basic compounds are not specifically defined, including, for example, aliphatic tertiary amine compounds, aromatic tertiary amine compounds, nitrogen-containing heterocyclic compounds, etc.

Also employable are quaternary ammonium salts of a general formula (IX):

In formula (IX), $R^{11}$ represents an organic group, for example, an alkyl or cycloalkyl group such as a methyl group, an ethyl group, a propyl group, a butyl group, a pentyl group, a hexyl group, an octyl group, a cyclohexyl group, etc.; an aryl group such as a phenyl group, a tolyl group, a naphthyl group, a biphenyl group, etc.; or an arylalkyl group such as a benzyl group, etc. Four $R^1$'s may be the same or different ones; and two of them may be bonded to each other to form a cyclic structure. $X^1$ represents a halogen atom, a hydroxyl group, or $BR_4$, in which R represents a hydrogen atom, or a hydrocarbon group such as an alkyl group, an aryl group or the like, and four R's maybe the same or different ones. Examples of the quaternary ammonium salts include ammonium hydroxides having alkyl, aryl and/or alaryl groups, such as tetramethylammonium hydroxide, tetraethylammonium hydroxide, tetrabutylammonium hydroxide, trimethylbenzylammonium hydroxide, etc.; and basic salts such as tetramethylammonium borohydride, tetrabutylammonium borohydride, tetrabutylammonium tetraphenyl borate, tetramethylammonium tetraphenyl borate, etc.

Of the nitrogen-containing, organic basic compounds noted above, preferred are the quaternary ammonium salts of formula (I), concretely such as tetramethylammonium hydroxide, tetrabutylammonium hydroxide, tetramethylammonium borohydride, and tetrabutylammonium borohydride, since they have high catalytic activity and since they are easily pyrolyzed and hardly remain in the polymers produced. Of those, especially preferred is tetramethylammonium hydroxide.

One or more of these nitrogen-containing, organic basic compounds are employable herein either singly or as combined.

It is desirable to use the nitrogen-containing, organic basic compound in an amount of from $10^{-8}$ to $10^{-2}$ mols, more preferably from $10^{-7}$ to $10^{-3}$ mols. If the amount of the nitrogen-containing, organic basic compound used is smaller than $10^{-8}$ mols, it is unfavorable since the catalytic activity in the initial stage of the reaction will be low; but if larger than $10^{-2}$ mols, it is also unfavorable since the cost of the catalyst increases.
<3> Crystallization of Prepolymer:

The prepolymer may be crystallized, for which the method is not specifically defined. To crystallize it, preferably, the prepolymer is processed in solvents or under heat. In the former solvent method, the prepolymer is crystallized in suitable solvents. The solvents include chloromethane, methylene chloride, chloroform, etc. The amount of the solvent to be used varies, depending on different conditions employed, but preferably falls between 0.05 and 100 times, more preferably between 0.1 and 50 times the weight of the prepolymer.

The other method of crystallization under heat is to crystallize the prepolymer by heating it at a temperature not lower than the glass transition temperature of the intended final product, aromatic polycarbonate, but lower than the temperature at which the prepolymer begins to melt. The temperature Tc (° C.) at which the prepolymer is crystallized under heat is not specifically defined, so far as it is not lower than the glass transition temperature of the intended final product, aromatic polycarbonate copolymer, but lower than the melting temperature Tm (° C.) of the prepolymer.

(3) Production of Polycarbonate Through Polymerization

To produce the polycarbonates of the invention, preferably, a polycarbonate prepolymer is first prepared, and it is polymerized in a solid or swollen solid phase or in a thin film melt phase in the presence of a quaternary phosphonium salt serving as a polymerization catalyst.

<1> Quaternary phosphonium salt:

The quaternary phosphonium salt is not specifically defined, and may be any and every one. For example, preferably used are compounds of the following general formula (IX) or (X):

In formulae (X) and (XI), $R^{12}$ represents an organic group. The organic group includes, for example, alkyl and cycloalkyl groups such as a methyl group, an ethyl group, a propyl group, a butyl group, a pentyl group, a hexyl group, an octyl group, a cyclohexyl group, etc.; an aryl group such as a phenyl group, a tolyl group, a naphthyl group, a biphenyl group, etc.; and an arylalkyl group such as a benzyl group, etc. Four $R^{12}$'s may be the same or different ones, or two of them may be bonded to each other to form a cyclic structure. $X^2$ represents a group capable of forming a mono-valent anion, such as a halogen atom, a hydroxyl group, an alkyloxy group, an aryloxy group, R'COO, $HCO_3$, $(R'O)_2P(=O)O$, BR"4 or the like. In those, R' represents a hydrocarbon group such as an alkyl group, an aryl group or the like, and two (R'O)s may be the same or different ones. R" represents a hydrogen atom, or a hydrocarbon group such as an alkyl group, an aryl group or the like, and four R"s may be the same or different ones. $Y^1$ represents a group capable of forming a di-valent anion, such as $CO_3$ or the like.

The quaternary phosphonium salts include, for example, tetra(aryl or alkyl)phosphonium hydroxides such as tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetramethylphosphonium hydroxide, tetraethylphosphonium hydroxide, tetrabutylphosphonium hydroxide, etc.; as well as tetramethylphosphonium tetraphenyl borate, tetraphenylphosphonium bromide, tetraphenylphosphonium phenolate, tetraphenylphosphonium tetraphenyl borate, methyltriphenylphosphonium tetraphenyl borate, benzyltriphenylphosphonium tetraphenyl borate, biphenyltriphenylphosphonium tetraphenyl borate, tetratolylphosphonium tetraphenyl borate, tetraphenylphosphonium phenolate, tetra (p-t-butylphenylyphosphonium diphenyl phosphate, triphenylbutylphosphonium phenolate, triphenylbutylphosphonium tetraphenyl borate, etc.

Of the quaternary phosphonium salts noted above, preferred are those having alkyl groups, since they have high catalytic activity and since they are easily pyrolyzed and hardly remain in the polymers produced. For example, preferably used are tetramethylphosphonium methyltriphenyl borate, tetraethylphosphonium ethyltriphenyl borate, tetrapropylphosphonium propyltriphenyl borate, tetrabutylphosphonium butyltriphenyl borate, tetrabutylphosphonium tetraphenyl borate, tetraethylphosphonium tetraphenyl borate, trimethylethylphosphonium trimethylphenyl borate, trimethylbenzylphosphonium benzyltriphenyl borate, etc.

Also preferred are tetraalkylphosphonium salts such as tetramethylphosphonium hydroxide, tetraethylphosphonium hydroxide, tetrabutylphosphonium hydroxide and others, as their decomposition temperature is relatively low and they are readily decomposed not remaining as impurities in the products, polycarbonates. In addition, since the number of carbon atoms constituting them is small, the scale of the unit batch for producing polycarbonates can be reduced. Therefore, they are preferred, as having the advantage of low production costs.

Except the compounds of formulae (X) and (XI) mentioned above, also usable herein are bis-tetraphenylphosphonium salt of 2,2-bis(4-hydroxyphenyl)propane, and ethylenebis(triphenylphosphonium) dibromide, trimethylenebis(triphenylphosphonium)-bis (tetraphenyl borate), etc.

Further usable are quaternary phosphonium salts having aryl groups and/or branched alkyl groups. For example, they are compounds of a general formula (XI):

or compounds of a general formula (XII):

In formulae (XII) and (XIII);

n represents an integer of from 1 to 4.

$R^{13}$ represents at least one selected from an aryl group and a branched alkyl group. The branched alkyl group has a structure of "$R_3C$—", in which R represents at least one selected from a hydrogen atom, an alkyl group, a substituted alkyl group, an aryl group, and a substituted aryl group, and at least two of the three R's may be bonded to each other to form a cyclic structure. In this, however, two R's must not be hydrogens at the same time. For example, it includes a cycloalkyl group, a branched alkyl group such as an isopropyl group, a tert-butyl group, etc., or an arylalkyl group such as a benzyl group, etc. When n is 2 or more, plural R's maybe the same or different ones.

$R^{14}$ represents an alkyl group, a substituted alkyl group, an aryl group, or a substituted aryl group.

$X^2$ represents a group capable of forming a mono-valent anion, such as a halogen atom, a hydroxyl group, an alkyloxy group, an aryloxy group, R'COO, $HCO_3$, $(R'O)_2P(=O)O$, BR"$_4$ or the like. In those, R' represents a hydrocarbon group such as an alkyl group, an aryl group or the like, and two (R'O)s may be the same or different ones. R" represents a hydrogen atom, or a hydrocarbon group such as an alkyl group, an aryl group or the like, and four R"s may be the same or different ones.

$Y^1$ represents a group capable of forming a di-valent anion, such as $CO_3$ or the like.

The quaternary phosphonium salts include, for example, tetra(aryl or alkyl)phosphonium hydroxides, such as tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetrahexylphosphonium hydroxide, etc.; mono(aryl or alkyl)triphenylphosphonium hydroxides, such as methyltriphenylphosphonium hydroxide, ethyltriphenylphosphonium hydroxide, propyltriphenylphosphonium hydroxide, butyltriphenylphosphonium hydroxide, octyltriphenylphosphonium hydroxide, tetradecyltriphenylphosphonium hydroxide, benzyltriphenylphosphonium hydroxide, ethoxybenzyltriphenylphosphonium hydroxide, methoxymethyltriphenylphosphonium hydroxide, acetoxymethyltriphenylphosphonium hydroxide, phenacyltriphenylphosphonium hydroxide, chloromethyltriphenylphosphonium hydroxide, bromomethyltriphenylphosphonium hydroxide, biphenyltriphenylphosphonium hydroxide, naphtyltriphenylphosphonium hydroxide, chlorophenyltriphenylphosphonium hydroxide, phenoxyphenyltriphenylphosphonium hydroxide, methoxyphenyltriphenylphosphonium hydroxide, acetoxyphenyltriphenylphosphonium hydroxide, naphtylphenyltriphenylphosphonium hydroxide, etc.; mono(aryl)trialkylphosphonium hydroxides, such as phenyltrimethylphosphonium hydroxide, biphenyltrimethylphosphonium hydroxide, phenyltrihexylphosphonium hydroxide, biphenyltrihexylphosphonium hydroxide, etc.; diaryldialkylphosphonium hydroxides, such as dimethyldiphenylphosphonium hydroxide, diethyldiphenylphosphonium hydroxide, di(biphenyl)diphenylphosphonium hydroxide, etc.; tetraarylphosphonium tetraphenyl borates, such as tetraphenylphosphonium tetraphenyl borate, tetranaphthylphosphonium tetraphenyl borate, tetra(chlorophenyl)phosphonium tetraphenyl borate, tetra(biphenyl)phosphonium tetraphenyl borate, tetratolyiphosphonium tetraphenyl borate, etc.; mono(aryl or alkyl)triphenylphosphonium tetraphenyl borates, such as methyltriphenylphosphonium tetraphenyl borate, ethyltriphenylphosphonium tetraphenyl borate, propyltriphenylphosphonium tetraphenyl borate, butyltriphenylphosphonium tetraphenyl borate, octyltriphenylphosphonium tetraphenyl borate, tetradecyltriphenylphosphonium tetraphenyl borate, benzyltriphenylphosphonium tetraphenyl borate, ethoxybenzyltriphenylphosphonium tetraphenyl borate, methoxymethyltriphenylphosphonium tetraphenyl borate, acetoxymethyltriphenylphosphonium tetraphenyl borate, phenacyltriphenylphosphonium tetraphenyl borate, chloromethyltriphenylphosphonium tetraphenyl borate, bromomethyltriphenylphosphonium tetraphenyl borate, biphenyltriphenylphosphonium tetraphenyl borate, naphtyltriphenylphosphonium tetraphenyl borate, chlorophenyltriphenylphosphonium tetraphenyl borate, phenoxyphenyltriphenylphosphonium tetraphenyl borate, acetoxyphenyltriphenylphosphonium tetraphenyl borate, naphthylphenyltriphenylphosphonium tetraphenyl borate, etc.; monoaryltrialkylphosphonium tetraphenyl borates, such as phenyltrimethylphosphonium tetraphenyl borate, biphenyltrimethylphosphonium tetraphenyl borate, phenyltrihexylphosphonium tetraphenyl borate, biphenyltrihexylphosphonium tetraphenyl borate, etc.; diaryldialkylphosphonium tetraphenyl borates, such as dimethyldiphenylphosphonium tetraphenyl borate, diethyldiphenylphosphonium tetraphenyl borate, di(biphenyl)diphenylphosphonium tetraphenyl borate, etc.

In these quaternary phosphonium salts, the counter anion, hydroxide or tetraphenyl borate, may be replaced with any of an aryloxy group such as phenoxide, etc., an alkyloxy group such as methoxide, ethoxide, etc., an alkylcarbonyloxy group such as acetate, etc., an arylcarbonyloxy group such as benzoate, etc., ahalogenatomsuch as chloride, bromide, etc., and these derivatives are also employable herein.

Apart from the compounds of formula (XII), also employable herein are compounds of formula (XIII) having a di-valent counter anion. As those, for example, mentioned are quaternary phosphonium salts such as bis(tetraphenylphosphonium) carbonate, bis(biphenyltriphenylphosphonium) carbonate, etc., as well as bis-tetraphenylphosphonium salt of 2,2-bis(4-hydroxyphenyl)propane, and ethylenebis(triphenylphosphonium) dibromide, trimethylenebis(triphenylphosphonium) bis-(tetraphenyl borate), etc.

In addition, further employable herein are compounds of general formulae (XIV) and (XV):

$$((R^{15}-Ph)_n-PPh_{(4-n)})^+(X^3)^- \quad (XIV)$$
$$((R^{15}-Ph)_n-PPh_{(4-n)})_2^+(y^2)^{2-} \quad (XV)$$

wherein $R^{15}$ represents an organic group, and plural $R^{15}$'s, if any, may be the same or different ones; $X^3$ represents a halogen atom, a hydroxyl group, an alkyloxy group, an aryloxy group, an alkylcarbonyloxy group, an arylcarbonyloxy group, $HCO_3$, or $BR_4$ (in which R represents a hydrogen atom or a hydrocarbon group, and four R's may be the same or different ones); Ph represents a phenyl group; $y^2$ represents $CO_3$; and n represents an integer of from 1 to 4.

Specific examples of those quaternary phosphonium compounds include, for example, tetraphenylphosphonium hydroxide, biphenyltriphenylphosphonium hydroxide, methoxyphenyltriphenylphosphonium hydroxide, phenoxyphenyltriphenylphosphonium hydroxide, naphthylphenyltriphenylphosphonium hydroxide, tetraphenylphosphonium tetraphenyl borate, biphenyltriphenylphosphonium tetraphenyl borate, methoxyphenyltriphenylphosphonium tetraphenyl borate, phenoxyphenyltriphenylphosphonium tetraphenyl borate, naphthylphenyltriphenylphosphonium tetraphenyl borate, tetraphenylphosphonium phenoxide, biphenyltriphenylphosphonium phenoxide, methoxyphenyltriphenylphosphonium phenoxide, phenoxyphenyltriphenylphosphonium phenoxide, naphthylphenyltriphenylphosphonium phenoxide, tetraphenylphosphonium chloride, biphenyltriphenylphosphonium chloride, methoxyphenyltriphenylphosphonium chloride, phenoxyphenyltriphenylphosphonium chloride, naphthylphenyltriphenylphosphonium chloride, etc. Of those quaternary phosphonium salts, preferred is tetraphenylphosphonium tetraphenyl borate in view of the balance between the catalytic activity of the compound and the Equality of the polycarbonates produced.

Specific examples of branched alkyl-having quaternary phosphonium salts include isopropyltrimethylphopshonium, isopropyltriethylphosphonium, isopropyltributylphosphonium, isopropyltriphenylphosphonium, tetraisopropylphosphonium, cyclohexyltriethylphosphonium, cyclohexyltrimethylphosphonium, cyclohexyltributylphosphonium, cyclohexyltriphenylphosphonium, tetracyclohexylphosphonium, 1,1,1-triphenylmethyltrimethylphosphonium, 1,1,1-triphenylmethyltriethylphosphonium, 1,1,1-triphenylmethyltributylphosphonium, 1,1,1-triphenylmethyltriphenylphosphonium, etc.

Specific examples of counter anions for $X^3$ include hydroxide, borohydride, tetraphenyl borate, acetate, propionate, fluoride, chloride, hydrocarbonate, etc.

One example of $y^2$ is carbonate.

As specific examples of salts composed of a branched alkyl-having quaternary phosphonium (cation) and X or Y (anion), mentioned are various combinations of the specific examples for cations and anions noted above. For those, specifically mentioned are isopropyltrimethylphosphonium hydroxide, cyclohexyltriphenylphosphonium chloride, 1,1,1-triphenylmethyltriethylphosphonium acetate, bis(isopropyltriethylphosphonium) carbonate, etc.

Of those branched alkyl-having quaternary phosphonium salts, especially preferred are cyclohexyltriphenylphosphonium tetraphenyl borate and cyclopentyltriphenylphosphonium tetraphenyl borate, since their catalytic activity and the quality of polycarbonates produced are well balanced.

Also mentioned for use herein are carboxylates such as tetramethylpnosphonium acetate, tetraethylphosphonium acetate, tetrapropylphosphonium acetate, tetrabutylphosphonium acetate, tetrapentylphosphonium acetate, tetrahexylphosphonium acetate, tetraheptylphosphonium acetate, tetraoctylphosphonium acetate, tetradecylphosphonium acetate, tetradodecylphosphonium acetate, tetratolylphosphonium acetate, tetraphenylphosphonium acetate, tetramethylphosphonium benzoate, tetraethylphosphonium benzoate, tetrapropylphosphonium benzoate, tetraphenylphosphonium benzoate, tetramethylphosphonium formate, tetraethylphosphonium formate, tetrapropylphosphonium formate, tetraphenylphosphonium formate, tetramethylphosphonium propionate, tetraethylphosphonium propionate, tetrapropylphosphonium propionate, tetramethylphosphonium butyrate, tetraethylphosphonium butyrate, tetrapropylphosphonium butyrate, etc.

It is desirable that the amount of metallic impurities in the quaternary phosphonium salts for use in the invention is as small as possible. Especially preferably, the amount of alkali metal and alkaline earth metal compounds in those salts is not larger than 50 ppm.

It is desirable to use the quaternary phosphonium salt in an amount of from $10^{-8}$ to $10^{-2}$ mols relative to one mol of the starting dihydroxy compound for the component (A). If the amount of the quaternary phosphonium salt used is smaller than $10^{-8}$ mols, it is unfavorable since the catalytic activity in the initial stage of the reaction will be low; but if larger than $10^{-2}$ mols, it is also unfavorable since the cost of the catalyst increases.

<2> Solid-phase Polymerization:

The crystallized solid prepolymer is polymerized in the presence of a quaternary phosphonium salt serving as a catalyst. In this case, the side products, aromatic monohydroxy compound and/or diaryl carbonate are removed from the reaction system, whereby the reaction is accelerated. For this, for example, preferably employed is a method of introducing an inert gas such as nitrogen, argon, helium, carbon dioxide or the like, or a hydrocarbon gas or a poor solvent gas into the reaction system to thereby remove the side products together with the gas, a method of effecting the reaction under reduced pressure, or a combination of the two. In the method of introducing the gas for accompanying the side products, it is desirable that the gas is pre-heated at a temperature near to the reaction temperature.

For the condition of the poor solvent usable herein, the solubility of the final product, polycarbonate in the solvent shall be at most 0.1% by weight under the reaction condition mentioned below, and the solvent shall have little influence on the reaction. Preferably, the poor solvent is a linear or branched, saturated hydrocarbon compound having from 4 to 18 carbon atom, or an unsaturated hydrocarbon compound having from 4 to 18 carbon atoms in which the degree of unsaturation is low. Its boiling point is preferably not higher than 250° C. If higher than 250° C., the remaining solvent will be difficult to remove, and the quality of the product will be poor.

The shape of the crystallized prepolymer to be subjected to solid-phase polymerization is not specifically defined, but the prepolymer is preferably in the form of pellets, beads or the like.

The reaction catalyst for solid-phase polymerization is preferably a quaternary phosphonium salt, but may be any other catalyst. The catalyst having been added to the system in the step of preparing the prepolymer, and still remaining therein could act, as it would be, also in the step of solid-phase polymerization, or the catalyst mentioned above may be added to the system. The additional catalyst may be powder, liquid or gaseous.

The reaction temperature, Tp (° C.), and the reaction time for solid-phase polymerization shall vary, depending on the type (including the chemical structure, the molecular weight) and the shape of the crystallized prepolymer, the presence or absence of the catalyst in the crystallized prepolymer, the type and the amount of the catalyst therein, the type and the amount of an additional catalyst that may be optionally added to the system, the degree of crystallization of the crystallized prepolymer, the melting temperature Tm' (° C.) of the crystallized prepolymer, the necessary degree of polymerization of the intended final product, aromatic polycarbonate copolymer, and other reaction conditions. Concretely, it is desirable that the prepolymer is polymerized in a solid phase while being heated at a temperature not lower than the glass transition temperature of the intended final product, aromatic polycarbonate copolymer and falling within the range within which the crystallized prepolymer being polymerized does not melt but could be all the time in a solid phase, more preferably falling within the range to be indicated by the following formula:

$$Tm'-50 \leq Tp < Tm' \qquad (XVI),$$

for 1 minute to 100 hours, more preferably for 0.1 to 50 hours or so.

For example, when a polycarbonate of bisphenol A is produced, the temperature range is preferably from about 150 to 260° C., more preferably from about 180 to 245° C.

In the polymerization step, the system is preferably agitated in order that the prepolymer being polymerized could be heated as uniformly as possible and that the side products could be removed from the system as smoothly as possible. For this, for example, the system is stirred, or the reactor is rotated, or the system is fluidized with hot gas.

In general, aromatic polycarbonates favorable to industrial use have a weight-average molecular weight of from 6000 to 200000 or so. In the solid-phase polymerization step as herein, polycarbonates having a degree of polymerization within that range are easy to produce.

The degree of crystallization of the aromatic polycarbonate to be obtained through solid-phase polymerization of the crystallized prepolymer is generally larger than that of the starting prepolymer. Therefore, the product obtained in the method of the invention is generally a crystalline, aromatic polycarbonate powder. The crystalline aromatic polycarbonate powder thus produced could be directly pelletized in an extruder, without being cooled, or could be directly molded in a molding machine also without being cooled. The ratio of the degree of prepolymerization which has some influence on the subsequent polymerization, to that of solid-phase polymerization may be varied in a broad range.

<3> Swollen Solid-phase Polymerization:

The prepolymer having been prepared in the prepolymerization step is crystallized, and then further polymerized in a solid phase while being swollen with a swelling gas. The swelling gas to be used herein is mentioned below. Swollen solid-phase polymerization is combined with transesterification to give the intended polycarbonates, in which the side products, low-molecular compounds such as phenols are removed through evaporation or extraction. For this, the low-molecular compounds are evaporated away or extracted out, while being separated from the high-molecular compound (prepolymer) having been swollen with a swelling gas introduced into the system. This is based on the principle that the removal of low-molecular compounds from swollen prepolymers through evaporation or extraction is more effective than that from high-viscosity prepolymer melts or from crystallized solid prepolymers, as the substance mobility rate is higher and the reaction efficiency is higher in the former than in the latter.

The swollen solid-phase polymerization method includes a step of flaking the prepolymer prepared in the previous step, and a step of further polymerizing the prepolymer to give a polymer having a higher molecular weight, through solid-phase polymerization in the presence of a swelling solvent stream (swollen solid-phase polymerization step).

The prepolymer favorable to the flaking step has a molecular weight falling between 2000 and 20000 in terms of the viscosity-average molecular weight (Mv). Prepolymers having a molecular weight lower than the defined range shall have a low melting point, for which the solid-phase polymerization temperature must be lowered. Therefore, such low-molecular prepolymers are unfavorable, as their reaction speed is low.

For flaking the prepolymer, any known method is employable. For example, employable case by case is any of rotary granulation, extrusion granulation, compression granulation, melting granulation, spray-drying granulation, fluidized-bed granulation, grinding granulation, stirring granulation, liquid-phase granulation, vacuum-freezing granulation, etc.

The shape of the prepolymer flakes is not specifically defined. In view of their easy handlability, preferred are pellets, beads and the like. To prepare the prepolymer flakes, effectively employed is a stirring granulation method that comprises once dissolving the prepolymer in a swelling solvent necessary in the next step, followed by flaking it while the prepolymer solution is mixed with a poor solvent for the intended product, polycarbonate. Prior to being polymerized, the prepolymer flakes do not need drying.

The swelling solvent to be used herein is meant to include single solvents capable of swelling polycarbonates by themselves under the reaction conditions that will be mentioned below; mixtures of such solvents; and mixtures to be prepared by adding one or more of poor solvents for polycarbonates to the single solvents or their mixtures. The swollen condition in this step is meant to indicate that the starting prepolymer flakes are swollen by volume or weight at least to a degree not lower than the thermal swell thereof under the reaction conditions to be mentioned below. The swelling solvent is a single compound having a boiling point at which it can completely vaporize within the range of the following reaction conditions or having a vapor pressure of generally not lower than 50 Torr under those reaction conditions, or a mixture of such compounds, and it can form the swollen condition defined above.

The swelling solvent for use herein is not specifically defined, so far as it satisfies the swelling conditions noted above. For example, aromatic compounds and oxygen-containing compounds having a solubility parameter of generally from 4 to 20 $(cal/cm^3)^{1/2}$, preferably from 4 to 14 $(cal/cm^3)^{1/2}$ belong to the category of the swelling solvent. Concretely, the swelling solvent for use in the invention includes, for example, aromatic hydrocarbons such as benzene, toluene, xylene, ethylbenzene, diethylbenzene, propylbenzene, dipropylbenzene, etc.; ethers such as tetrahydrofuran, dioxane, etc.; ketones such as methyl ethyl ketone, methyl isobutyl ketone, etc. Of those, preferred are single compounds of aromatic hydrocarbons having from 6 to 20 carbon atoms, and their mixtures.

Regarding its conditions, the poor solvent to be mixed with the swelling solvent shall be such that the solubility of the product, polycarbonate in it is at most 0.1% by weight under the reaction conditions to be mentioned below and that it participates little in the reaction. Preferred examples of the poor solvent are linear or branched, saturated hydrocarbon compounds having from 4 to 18 carbon atoms, or hydrocarbon compounds unsaturated to a low degree and having from 4 to 18 carbon atoms. If the boiling point of the swelling solvent and that of the poor solvent are both above 250° C., it is unfavorable since the remaining solvents will be difficult to remove from the product, polycarbonate and the quality of the product will be poor.

Where a mixture of the poor solvent and the swelling solvent is used herein, the proportion of the swelling solvent shall be at least 1% by weight of the mixed solvent, but preferably at least 5% by weight thereof.

In the swollen solid-phase polymerization step, the reaction temperature preferably falls between 100 and 240° C., and the reaction pressure preferably falls between 10 Torr and 5 $kg/cm^2G$, but is more preferably not higher than the atmospheric pressure. If the reaction temperature is lower than the defined range, the prepolymer could not undergo transesterification. On the other hand, however, if the reaction is effected at high-temperature conditions exceeding the melting point of the prepolymer, the reaction system could not keep a solid phase, and the prepolymer particles will fuse together at such high temperatures. If so, the operability to continue the reaction will be greatly lowered. Therefore, the reaction temperature must not be higher than the melting point of the prepolymer.

As the reaction catalyst in the swollen solid-phase polymerization step, used are a quaternary phosphonium salt and optionally any other catalyst. The reaction catalyst having been added to and still remaining in the prepolymerization system could act, as it would be, further in the swollen solid-phase polymerization step, but, as the case maybe, an additional catalyst such as that mentioned above may be added to the swollen solid-phase polymerization system. The additional catalyst may be powdery, liquid or gaseous.

Regarding the mode of feeding the swelling solvent gas into the polymerization system, the liquid solvent may be directly fed into the reactor and is vaporized therein; or the liquid solvent is, after having been previously vaporized by the use of a heat exchanger or the like, fed into the reactor. The flow rate of the swelling gas solvent may be at least $1 \times 10^{-3}$ cm/sec, but is preferably at least $1 \times 10^{-3}$ cm/sec. The amount of the swelling gas to be fed into the reactor is preferably at least 0.5 liters (ground state)/hr/g of prepolymer. The flow rate of the swelling gas solvent is closely related with the reaction rate. The swelling gas solvent acts to remove phenols and serves as a heat medium, and the reaction rate increases with the increase in the gas flow rate. The reactor to be used herein for such swollen solid-phase polymerization is not specifically defined.

The polycarbonate of which the molecular weight has been increased in the manner as above may be dried and pelletized in any known manner with no limitation. When additives such as those mentioned above are added to the polycarbonate, some preferred methods are employed; for example, additive powder may be directly added to the flaky polymer product before or after the product is dried; or additive liquid may be sprayed over the product; or additive vapor may be applied thereto so that the product could absorb it. Apart from the methods, additives may be added to the polymer product in an extruder before the product is pelletized.

The blend ratio of the inert gas to the swelling solvent may be such that the swelling solvent accounts for at least 1% by volume of the mixed solvent gas, but preferably at least 5% by volume thereof.

<4> Oxygen Concentration and Water Concentration in Vapor-phase Polymerization System:

In the invention, the oxygen concentration in the vapor phase in the polymerization reaction system must be at most 2 ppm, but is preferably at most 1 ppm, more preferably at most 0.5 ppm. It is desirable that the water concentration in the reaction system is at most 2 ppm, more preferably at most 1 ppm. If the oxygen concentration in the polymerization reaction system is larger than 2 ppm, the resins to be obtained will be often discolored and their thermal stability is poor. On the other hand, if the water concentration therein is larger than 2 ppm, it is undesirable since the polymers being produced will be hydrolyzed and since too much water will have some negative influences on the activity of the catalyst being used.

The method for lowering the oxygen concentration in the reaction system to be at most 2 ppm and for lowering the water concentration therein also to be at most 2 ppm is not specifically defined. For example, an oxygen-removing duct equipped with an oxygen filter or the like and a water-removing duct equipped with a moisture filter or the like may be disposed before the polymerization reactor in the production line.

<5> Thin Film Melt-phase Polymerization:

The polycarbonate prepolymer mentioned above may be put into a polymerization reactor equipped with heating, pressure-reducing and melt film-forming units, in which the prepolymer may be polymerized into a polymer having an increased molecular weight while it is melted to form a thin melt film by driving the pressure-reducing unit. This method is referred to as a thin-film polymerization method. In the method, the transesterification of the prepolymer is much promoted to give a polymer having an increased molecular weight. In the method, in general, the prepolymer in melt forms a thin melt film having a thickness of at most 5 mm, preferably at most 3 mm, more preferably at most 1 mm in the presence of a catalyst such as the above-mentioned quaternary phosphonium salt or the like, and undergoes transesterification at a reaction temperature falling between 50 and 320° C., preferably between 100 and 320° C., more preferably between 150 and 280° C., under a reaction pressure falling between 0.1 Torr and 5 kg/cm$^2$G, for a reaction period of time falling between 1 minute and 100 hours, preferably between 2 and 20 hours.

Forming the thin melt film of the prepolymer is not specifically defined, for which, for example, employed is the method mentioned hereinabove in the section of <1> pre-polymerization. Briefly, the prepolymer is dissolved in the solvent mentioned above, then the resulting solution is spread over the bottom of the reactor having a broad bottom area, and the solvent is evaporated away under heat to give a thin melt film of the prepolymer.

The thin-film polymerization method is one particular method of known melt transesterification methods, and it is targeted to accelerating phenol vapor removal to promote the reaction. Another advantage of the method is that the polymer produced is prevented as much as possible from being degraded by the released phenol to thereby attain the object of the invention which is to reduce the impurities in the polycarbonates.

The polycarbonates of the invention may be mixed with any known additives of, for example, plasticizers, pigments, lubricating agents, mold-releasing agents, stabilizers, inorganic fillers, etc., before they are used. The polycarbonates may be blended with any other polymers, such as polyolefins, polystyrenes, polyesters, polysulfonates, polyamides, polyphenylene ethers, etc. In particular, they are effectively blended with polyphenylene ethers, polyether nitriles, terminal-modified polysiloxane compounds, modified polypropylenes, modified polystyrenes and the like having OH, COOH, NH$_2$ or the like group at their terminals.

3. Optical Materials and Others Containing Polycarbonate

In the polycarbonates of the invention, the monomers remaining therein are reduced. Therefore, the polycarbonates are not yellowed and their molecular weight and physical properties are not degraded. Accordingly, the polycarbonates are extremely favorable to optical materials.

In the invention, a terminating agent such as cumylphenol or the like is optionally used in producing the polycarbonates. In ordinary melt polymerization, such a terminating agent is difficult to use, and polycarbonate molecules could be hardly terminated with it. However, in the invention, the polycarbonates can be easily terminated even with such a terminating agent in solid-phase or swollen solid-phase polymerization. As will be known, the physical properties including the low-temperature impact resistance of the polycarbonates of the invention are improved, in addition to the above-mentioned improvements, and the polycarbonates are useful as optical materials.

In producing the polycarbonates of the invention, optionally used is a branching agent. As will be known, the physical properties including the melt tension of the polycarbonates are improved, in addition to the above-mentioned improvements, and the polycarbonates are useful as blow molding materials.

EXAMPLES

The invention is described in more detail with reference to the following Examples and Comparative Examples, which, however, are not intended to restrict the scope of the invention.

Example 1

228 g (1.0 mol) of bisphenol A (BPA), 246 g (1.15 mols) of diphenyl carbonate (DPC) and 0.5 mmols of tetramethylammonium hydroxide (TMAH) were put into a one liter nickel steel autoclave equipped with a stirrer, and purged with argon five times in all. Next, the mixture was heated at 190° C. and reacted for 30 minutes in the argon atmosphere. Next, this was further heated gradually up to 235° C. and reacted for 60 minutes while being degassed up to a vacuum degree of 60 Torr; then this was still further heated gradually up to 270° C. and reacted for 120 minutes while being degassed up to a vacuum degree of 10 Torr; and this was still further reacted for 30 minutes while being degassed up to a vacuum degree of 1 Torr and then for 30 minutes while being degassed up to a vacuum degree of 0.5 Torr all at the same temperature of 270° C. After having been thus reacted, the system in the reactor was purged with argon to have an atmospheric pressure, and the prepolymer thus formed was taken out and ground.

The viscosity-average molecular weight of the prepolymer was 7200, and the terminal hydroxyl fraction thereof was 30%.

The prepolymer was dissolved in methylene chloride along with $10^{-5}$ mols of cyclohexyltriphenylphosphonium tetraphenyl borate (HPTB) serving as a catalyst, to which was added n-heptane so as to deposit the prepolymer. After concentrated to be solid, this was dried in vacuum to obtain a powder of the prepolymer. 9 g of the powder was put into a SUS tube having a diameter of 10 mm and a length of 200 mm, into which was introduced nitrogen gas at a flow rate of 100 ml/min. In that condition, this was heated from room temperature up to 240° C., and polymerized in a solid phase for 4 hours to obtain a polycarbonate. Its data are given in Table 1.

Example 2

The same process as in Example 1 was repeated, except that heptane gas was introduced into the solid-phase polymerization system. The data of the polycarbonate thus produced herein are given in Table 1.

Example 3

8.04 g of the prepolymer prepared in Example 1 was put on a SUS laboratory dish having a diameter of 32 cm, to which was added 10 ml of methylene chloride. On the dish, the prepolymer was dissolved in methylene chloride along with $10^{-5}$ mols of a catalyst, tetraphenylphosphonium tetraphenyl borate (TPTB) added thereto. Next, methylene chloride was evaporated away, and a thin film having a thickness of 0.01 cm was formed on the dish. Next, the thin-film prepolymer was polymerized in melt in a reduced-pressure oven equipped with a hot plate, at 270° C. and 0.5 Torr for 4 hours to obtain a polycarbonate. Its data are given in Table 1.

Comparative Example 1

The same process as in Example 1 was repeated. In this, however, the amount of DPC added to the reactor was 236 g (1.1 mols) and the prepolymer formed had a terminal hydroxyl fraction of 50%, and, in the solid-phase polymerization step, $10^{-5}$ mols of tetraphenylphosphonium tetraphenyl borate (TPTB) was used as the catalyst and the polymerization time was 0.5 hours. The data of the polymer produced herein are given in Table 1.

Comparative Example 2

The same process as in Example 1 was repeated. In this, however, the amount of DPC added to the reactor was 236 g (1.1 mols) and the prepolymer formed had a terminal hydroxyl fraction of 61%. The data of the polymer produced herein are given in Table 1.

Comparative Example 3

The same process as in Example 1 was repeated. In this, however, no catalyst was used in the solid-phase polymerization step, and the polymerization time was 93 hours. The data of the polymer produced herein are given in Table 1.

Comparative Example 4

Not undergoing solid-phase polymerization, the monomers of Example 1 were directly polymerized like in the process of prepolymer formation in Example 1. In this, however, tetramethylammonium hydroxide (0.5 mmols) and tetraphenylphosphonium tetraphenylborate (0.01 mmols) both serving as a catalyst were added to the reaction system, and the polymerization time under the vacuum degree of 0.5 Torr was 3 hours. The data of the polymer produced herein are given in Table 1.

Example 4

228 g (1.0 mol) of bisphenol A (BPA), 1.23 g (0.004 mols) of 1,1,1-tris (4-hydroxyphenylethane) (THPE), 257 g (1.2 mols) of diphenyl carbonate (DPC) and 0.5 mmols of tetramethylammonium hydroxide (TMAH) were put into a one liter nickel autoclave equipped with a stirrer, and purged with argon five times in all. Next, the mixture was heated at 190° C. and reacted for 30 minutes in the argon atmosphere. Next, this was further heated gradually up to 235° C. and reacted for 60 minutes while being degassed up to a vacuum degree of 60 Torr; then this was still further heated gradually up to 270° C. and reacted for 120 minutes while being degassed up to a vacuum degree of 10 Torr; and this was still further reacted for 30 minutes while being degassed up to a vacuum degree of 1 Torr and then for 30 minutes while being degassed up to a vacuum degree of 0.5 Torr all at the same temperature of 270° C. After having been thus reacted, the system in the reactor was purged with argon to have an atmospheric pressure, and the prepolymer thus formed was taken out and ground.

The viscosity-average molecular weight of the prepolymer was 10900, and the terminal hydroxyl fraction thereof was 30%.

The prepolymer was dissolved in methylene chloride along with 0.0066 g ($1\times10^{-5}$ mols/BPA units) of cyclohexyltriphenylphosphonium tetraphenyl borate (HPTB) serving as a solid-phase polymerization catalyst, to which was added n-heptane so as to deposit the prepolymer. After concentrated to be solid, this was dried in vacuum to obtain a powder of the prepolymer. 20 g of the powder was put into a SUS tube having a diameter of 58 mm and a length of 170 mm, into which was introduced nitrogen gas at a flow rate of 100 ml/min. In that condition, this was heated from room temperature up to 240° C., and polymerized in a solid phase for 4 hours to obtain a polycarbonate. Its data are given in Table 2.

Example 5

The same process as in Example 4 was repeated, except that heptane gas was introduced into the solid-phase polymerization system. The data of the polycarbonate thus produced herein are given in Table 1.

Comparative Example 5

Not undergoing solid-phase polymerization, the monomers of Example 4 were directly polymerized like in the process of prepolymer formation in Example 4. In this, however, tetramethylammonium hydroxide (TMAH) (0.5 mmols) and tetraphenylphosphonium tetraphenylborate (TPTB) (0.01 mmols) both serving as a catalyst were added to the reaction system, and the polymerization time under the vacuum degree of 0.5 Torr was 3 hours. The data of the polymer produced herein are given in Table 1.

Example 6

228 g (1.0 mol) of bisphenol A (BPA), 10.6 g (0.05 mols) of p-cumylphenol and 0.5 mmols of tetramethylammonium hydroxide (TMAH) were put into a one liter nickel autoclave equipped with a stirrer, and purged with argon five times in all. Next, the mixture was heated at 190° C. and reacted for 30 minutes in the argon atmosphere. Next, this was further heated gradually up to 235° C. and reacted for 60 minutes while being degassed up to a vacuum degree of 60 Torr; then this was still further heated gradually up to 270° C. and reacted for 120 minutes while being degassed up to a vacuum degree of 10 Torr; and this was still further reacted for 30 minutes while being degassed up to a vacuum degree of 1 Torr and then for 30 minutes while being degassed up to a vacuum degree of 0.5 Torr all at the same temperature of 270° C. After having been thus reacted, the system in the reactor was purged with argon to have an atmospheric pressure, and the prepolymer thus formed was taken out and ground.

The viscosity-average molecular weight of the prepolymer was 8600, and the terminal hydroxyl fraction thereof was 33%.

The prepolymer was dissolved in methylene chloride along with 0.0066 g ($1 \times 10^{-5}$ mols/BPA units) of cyclohexyltriphenylphosphonium tetraphenyl borate (HPTB) serving as a solid-phase polymerization catalyst, to which was added n-heptane so as to deposit the prepolymer. After concentrated to be solid, this was dried in vacuum to obtain a powder of the prepolymer. 20 g of the powder was put into a SUS tube having a diameter of 58 mm and a length of 170 mm, into which was introduced nitrogen gas at a flow rate of 100 ml/min. In that condition, this was heated from room temperature up to 240° C., and polymerized in a solid phase for 4 hours to obtain a polycarbonate. Its data are given in Table 3.

Example 7

The same process as in Example 6 was repeated, except that heptane gas was introduced into the solid-phase polymerization system. The data of the polycarbonate thus produced herein are given in Table 3.

Example 8

The same process as in Example 6 was repeated, except that p-tert-butylphenol but not p-cumylphenol was used. The data of the polycarbonate thus produced herein are given in Table 3.

Example 9

The same process as in Example 6 was repeated, except that p-tert-octylphenol but not p-cumylphenol was used. The data of the polycarbonate thus produced herein are given in Table 3.

Comparative Example 6

Not undergoing solid-phase polymerization, the monomers of Example 6 were directly polymerized like in the process of prepolymer formation in Example 6. In this, however, tetramethylammonium hydroxide (TMAH) (0.5 mmols) and tetraphenylphosphonium tetraphenylborate (TPTB) (0.01 mmols) both serving as a catalyst were added to the reaction system, and the polymerization time under the vacuum degree of 0.5 Torr was 3 hours. The data of the polymer produced herein are given in Table 3.

Example 10

228 g (1.0 mol) of bisphenol A (BPA), 246 g (1.15 mols) of diphenyl carbonate (DPC), 0.5 mmols of tetramethylammonium hydroxide (TMAH) and $1 \times 10^{-5}$ mols of tetraphenylphosphonium tetraphenyl borate (TPTB) were put into a one liter nickel steel autoclave equipped with a stirrer, and purged with argon five times in all. Next, the mixture was heated at 190° C. and reacted for 30 minutes in the argon atmosphere. Next, this was further heated gradually up to 235° C. and reacted for 60 minutes while being degassed up to a vacuum degree of 60 Torr; then this was still further heated gradually up to 270° C. and reacted for 120 minutes while being degassed up to a vacuum degree of 10 Torr; and this was still further reacted for 30 minutes while being degassed up to a vacuum degree of 1 Torr and then for 30 minutes while being degassed up to a vacuum degree of 0.5 Torr all at the same temperature of 270° C. After having been thus reacted, the system in the reactor was purged with argon to have an atmospheric pressure, and the prepolymer thus formed was taken out and ground.

The viscosity-average molecular weight of the prepolymer was 7200, and the terminal hydroxyl fraction thereof was 30%.

8.04 g of the prepolymer was put on a SUS laboratory dish having a diameter of 32 cm, to which was added 10 ml of methylene chloride. On the dish, the prepolymer was dissolved in methylene chloride. Next, methylene chloride was evaporated away, and a thin film having a thickness of 0.01 mm was formed on the dish. This was dried overnight at 120° C. in vacuum. Next, the thin-film prepolymer was polymerized in melt in a reduced-pressure oven equipped with a hot plate, at 270° C. and 0.5 Torr for 4 hours to obtain a polycarbonate. Its data are given in Table 4.

Example 11

The same process as in Example 10 was repeated, except that the time for thin film melt polymerization of the prepolymer was 1 hour but not 4 hours. The data of the polycarbonate produced herein are given in Table 4.

Comparative Example 7

228 g (1.0 mol) of bisphenol A (BPA), 246 g (1.15 mols) of diphenyl carbonate (DPC), 0.5 mmols of tetramethylammonium hydroxide (TMAH) and $1 \times 10^{-5}$ mols of tetraphenylphosphonium tetraphenyl borate (TPTB) were put into a one liter nickel steel autoclave equipped with a stirrer, and purged with argon five times in all. Next, the mixture was heated at 190° C. and reacted for 30 minutes in the argon atmosphere. Next, this was further heated gradually up to 235° C. and reacted for 60 minutes while being degassed up to a vacuum degree of 60 Torr; then this was still further heated gradually up to 270° C. and reacted for 120 minutes while being degassed up to a vacuum degree of 10 Torr; and this was still further reacted for 30 minutes while being degassed up to a vacuum degree of 1 Torr and then for 3 hours while being degassed up to a vacuum degree of 0.5 Torr all at the same temperature of 270° C. After having been thus reacted, the system in the reactor was purged with argon to have an atmospheric pressure, and the polycarbonate thus formed was taken out. Its data are given in Table 4.

TABLE 1

|  | Catalyst in Prepolymerization | | Catalyst in Final Polymerization | | Viscosity-average Molecular Weight (Mv) | Terminal Hydroxyl Fraction (mol %) | Remaining Monomers (ppm) | | | Acetone Soluble Content (wt. %) | Cyclic Oligomer Content (wt. %) |
|---|---|---|---|---|---|---|---|---|---|---|---|
|  | Compound | Amount Used (mol/mol BPA) | Compound | Amount Used (mol/mol BPA) |  |  | Phenol | BPA | DPC |  |  |
| Example 1 | TMAH | $0.5 \times 10^{-3}$ | HPTB | $1 \times 10^{-5}$ | 19000 | 0.8 | 2 | 7 | at most 1 | 1.0 | 0.11 |
| Example 2 | TMAH | $0.5 \times 10^{-3}$ | HPTB | $1 \times 10^{-5}$ | 18500 | 8.6 | 10 | 30 | 30 | 2.0 | 0.13 |
| Example 3 | TMAH | $0.5 \times 10^{-3}$ | TPTB | $1 \times 10^{-5}$ | 21200 | 6.5 | 0 | 10 | 10 | 2.0 | 0.26 |
| Comp. Ex. 1 | TMAH | $0.5 \times 10^{-3}$ | TPTB | $1 \times 10^{-5}$ | 16500 | 50.0 | 110 | 130 | 110 | — | — |
| Comp. Ex. 2 | TMAH | $0.5 \times 10^{-3}$ | HPTB | $1 \times 10^{-5}$ | 26000 | 70.4 | 10 | 100 | 10 | 2.9 | 0.21 |
| Comp. Ex. 3 | TMAH | $0.5 \times 10^{-3}$ | — | — | 11200 | 25.3 | 10 | 100 | at most 1 | 5.1 | 0.15 |
| Comp. Ex. 4 | TMAH | $0.5 \times 10^{-3}$ | TPTB | $1 \times 10^{-5}$ | 15900 | 20.0 | at most 1 | 30 | 450 | 3.3 | 0.51 |

(Notes)
TMAH: tetramethylammonium hydroxide
HPTB: cyclohexyltriphenylphosphonium tetraphenyl borate
TPTB: tetraphenylphosphonium tetraphenyl borate
BPA: bisphenol A
DPC: diphenyl carbonate

TABLE 2

|  | Catalyst in Prepolymerization | | Catalyst in Final Polymerization | | Viscosity-average Molecular Weight (Mv) | Terminal Hydroxyl Fraction (mol %) | Remaining Monomers (ppm) | | | Acetone Soluble Content (wt. %) | Cyclic Oligomer Content (wt %) |
|---|---|---|---|---|---|---|---|---|---|---|---|
|  | Compound | Amount Used (mol/mol BPA) | Compound | Amount Used (mol/mol BPA) |  |  | Phenol | BPA | DPC |  |  |
| Example 4 | TMAH | $0.5 \times 10^{-3}$ | HPTB | $1 \times 10^{-5}$ | 28800 | 8.0 | 10 | 10 | 10 | 1.2 | 0.12 |
| Example 5 | TMAH | $0.5 \times 10^{-3}$ | HPTB | $1 \times 10^{-5}$ | 29200 | 7.8 | 10 | 20 | 10 | 1.4 | 0.13 |
| Comp. Ex. 5 | TMAH | $0.5 \times 10^{-3}$ | TPTB | $1 \times 10^{-5}$ | 28200 | 15.1 | 20 | 30 | 230 | 3.2 | 0.45 |

(Notes)
TMAH: tetramethylammonium hydroxide
HPTB: cyclohexyltriphenylphosphonium tetraphenyl borate
TPTB: tetraphenylphosphonium tetraphenyl borate
BPA: bisphenol A
DPC: diphenyl carbonate

|  | Terminating Agent | Catalyst Used | | Viscosity-average Molecular Weight (Mv) | Terminal Fraction (mol %) | | | Remaining Monomers (ppm) | | | Acetone Soluble Content (wt. %) | Cyclic Oligomer Content (wt. %) |
|---|---|---|---|---|---|---|---|---|---|---|---|---|
|  |  | Prepoly-merization | Solid-phase Polymerization |  | OH | cumyl | phenyl | Phenol | BPA | DPC |  |  |
| Example 6 | p-p-cumylphenol | TMAH | HPTB | 26300 | 1.0 | 75.0 | 24.0 | 10 | 30 | 10 | 0.7 | 0.09 |
| Example 7 | p-cumylphenol | TMAH | HPTB | 25900 | 3.0 | 72.0 | 25.0 | 10 | 20 | 10 | 0.8 | 0.10 |
| Example 8 | p-butylphenol | TMAH | HPTB | 25500 | 2.0 | 71.0 | 27.0 | 10 | 20 | 20 | 1.0 | 0.11 |
| Example 9 | p-octylphenol | TMAH | HPTB | 32200 | 3.2 | 75.0 | 22.0 | 10 | 20 | 10 | 0.6 | 0.19 |
| Comp. Ex. 6 | p-cumylphenol | TMAH | TPTB | 18000 | 20.0 | 54.0 | 26.0 | 10 | 30 | 240 | 3.2 | 0.46 |

(Notes)
TMAH: tetramethylammonium hydroxide
HPTB: cyclohexyltriphenylphosphonium tetraphenyl borate
TPTB: tetraphenylphosphonium tetraphenyl borate
BPA: bisphenol A
DPC: diphenyl carbonate

INDUSTRIAL APPLICABILITY

According to the invention, provided are polycarbonates which contain a reduced amount of impurities such as remaining monomers, oligomers and others and which have improved physical properties including impact strength, etc.

What is claimed is:

1. A polycarbonate produced by preparing a polycarbonate prepolymer through prepolymerization followed by polymerizing the prepolymer by solid-phase, swollen solid-phase or thin film melt-phase transesterification, of which a total of the dihydroxy compound content, dicarbonate content and monohydroxy compound content is smaller than 100 ppm, and an acetone soluble content thereof is at most 3.0% by weight when polymerization of the prepolymer is conducted by thin film melt-phase transesterification, or an acetone soluble content thereof is at most 3.5% by weight when polymerization of the prepolymer is conducted by solid-phase or swollen solid-phase transesterification.

2. A polycarbonate produced by preparing a polycarbonate prepolymer through prepolymerization followed by polymerizing the prepolymer through solid-phase, swollen solid-phase or thin film melt-phase transesterification, of which a dihydroxy compound content is smaller than 100 ppm, and an acetone soluble content thereof is at most 3.0% by weight when polymerization of the prepolymer is conducted by thin film melt-phase transesterification, or an acetone soluble content thereof is at most 3.5% by weight when polymerization of the prepolymer is conducted by solid-phase or swollen solid-phase transesterification.

3. A polycarbonate produced by transesterification of a dihydroxy compound and a dicarbonate, of which an acetone soluble content thereof is at most 2.0% by weight.

4. A polycarbonate produced by preparing a polycarbonate prepolymer through prepolymerization followed by polymerizing the prepolymer through solid-phase or swollen solid-phase transesterification, of which a terminal hydroxyl fraction is smaller than 2 mol %, and an acetone soluble content thereof is at most 3.5% by weight.

5. A polycarbonate produced by preparing a polycarbonate prepolymer through prepolymerization followed by polymerizing the prepolymer through thin film melt-phase transesterification, of which a terminal hydroxyl fraction is smaller than 15 mol %, and an acetone soluble content thereof is at most 3.0% by weight.

6. A polycarbonate produced by preparing a polycarbonate prepolymer through prepolymerization followed by polymerizing the prepolymer by solid-phase, swollen solid-phase or thin film melt-phase transesterification, of which a cyclic oligomer content thereof is at most 0.45% by weight, and an acetone soluble content thereof is at most 3.0% by weight when polymerization of the prepolymer is conducted by thin film melt-phase transesterification, or an acetone soluble content thereof is at most 3.5% by weight when polymerization of the prepolymer is conducted by solid-phase or swollen solid-phase transesterification.

7. The polycarbonate of claim 1, wherein the polycarbonate prepolymer is prepared by thermal polymerization of (A) an aromatic dihydroxy compound, (B) a dicarbonate and (C) a monohydroxy compound.

8. The polycarbonate of claim 2, wherein the polycarbonate prepolymer is prepared by thermal polymerization of (A) an aromatic dihydroxy compound, (B) a dicarbonate and (C) a monohydroxy compound.

9. The polycarbonate of claim 6, wherein the polycarbonate prepolymer is prepared by thermal prepolymerization of (A) an aromatic dihydroxy compound, (B) a dicarbonate and (C) a monohydroxy compound.

10. A polycarbonate produced by preparing a polycarbonate prepolymer by thermal prepolymerization of (A) an aromatic dihydroxy compound, (B) a dicarbonate and (C) a monohydroxy compound followed by polymerizing the prepolymer by solid-phase or swollen solid-phase transesterification, of which a monohydroxy compound-based terminal fraction is at least 50 mol %, and an acetone soluble content thereof is at most 3.5% by weight.

11. A polycarbonate produced by preparing a polycarbonate prepolymer by thermal prepolymerization of (A) an aromatic dihydroxy compound, (B) a dicarbonate and (C) a monohydroxy compound followed by polymerizing the prepolymer by solid-phase or swollen solid-phase transesterification, of which a terminal hydroxy fraction is smaller than 15 mol %.

12. An optical material, comprising the polycarbonate of claim 1.

13. An optical material, comprising the polycarbonate of claim 2.

14. An optical material, comprising the polycarbonate of claim 3.

15. An optical material, comprising the polycarbonate of claim 4.

16. An optical material, comprising the polycarbonate of claim 5.

17. An optical material, comprising the polycarbonate of claim 6.

18. An optical material, comprising the polycarbonate of claim 7.

19. An optical material, comprising the polycarbonate of claim 8.

20. An optical material, comprising the polycarbonate of claim 9.

21. The polycarbonate of claim 1, wherein the polycarbonate prepolymer is prepared by thermal prepolymerization of (A) an aromatic dihydroxy compound, (B) a dicarbonate and (C) a poly-functional organic compound having at least three functional groups.

22. The polycarbonate of claim 2, wherein the polycarbonate prepolymer is prepared by thermal prepolymerization of (A) an organic dihydroxy compound, (B) a dicarbonate and (C) a poly-functional organic compound having at least three functional groups.

23. The polycarbonate of claim 6, wherein the polycarbonate prepolymer is prepared by thermal prepolymerization of (A) an aromatic dihydroxy compound, (B) a dicarbonate and (C) a poly-functional organic compound having at least three functional groups.

24. A polycarbonate produced by preparing a polycarbonate prepolymer by thermal prepolymerization of (A) an aromatic dihydroxy compound, (B) a dicarbonate and (C) a poly-functional organic compound having at least three functional groups, followed by polymerizing the prepolymer by solid-phase or swollen solid-phase transesterification, of which a terminal hydroxyl fraction is smaller than 15 mol %, and an acetone soluble content thereof of at most 3.5% by weight.

25. A blow molding material, comprising the polycarbonate of claim 21.

26. A blow molding material, comprising the polycarbonate of claim 24.

* * * * *